A. I. FISCHER.
COMBINED CHECK AND COMPRESSION VALVE.
APPLICATION FILED FEB. 14, 1917.

1,311,115.

Patented July 22, 1919.

INVENTOR
ARTHUR I. FISCHER

BY

ATTORNEYS

UNITED STATES PATENT OFFICE.

ARTHUR I. FISCHER, OF CLEVELAND, OHIO, ASSIGNOR TO GLAUBER BRASS MANUFACTURING COMPANY, OF CLEVELAND, OHIO.

COMBINED CHECK AND COMPRESSION VALVE.

1,311,115.     Specification of Letters Patent.     Patented July 22, 1919.

Application filed February 14, 1917. Serial No. 148,579.

*To all whom it may concern:*

Be it known that I, ARTHUR I. FISCHER, citizen of the United States, residing at Cleveland, in the county of Cuyahoga and State of Ohio, have invented certain new and useful Improvements in Combined Check and Compression Valves, of which the following is a specification.

This invention pertains to a combined check and compression valve, and consists in the construction and combination of parts substantially as shown and described and particularly pointed out in the claim.

Figure 1:
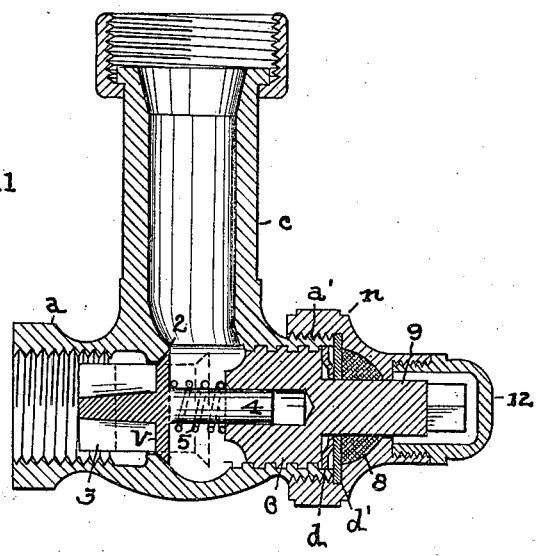
Figure 2:
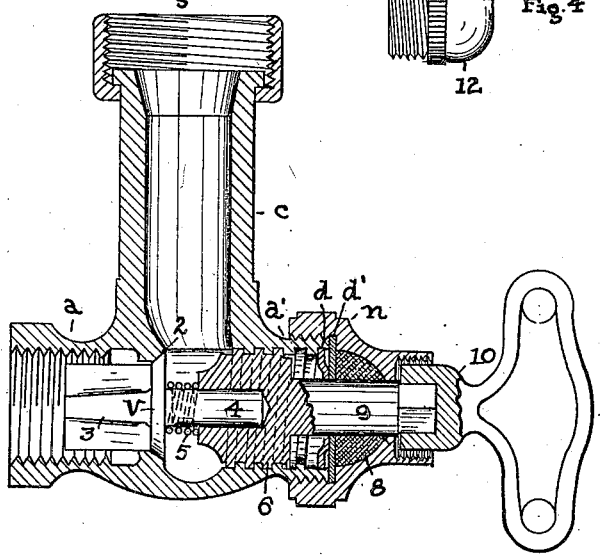

In the accompanying drawings, Figure 1 is a vertical sectional elevation of the complete device showing the valve closed but free to open under fluid pressure from the main or supply, and Fig. 2 is a sectional elevation showing the valve closed and locked to its seat.

Figure 3:
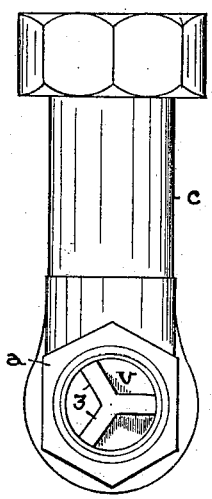
Figure 4:
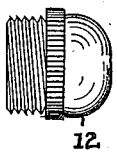

Fig. 3 is an elevation of the device looking in from the left of Fig. 2, and Fig. 4 is a detail of the cap, removable to insert the key for rotating the plug in which the valve stem is mounted.

The device as thus shown comprises a pipe joint or casing $c$ of substantially T shape, having two threaded arms $a$ and $a'$ at one end and adapted to be coupled up in a water supply installation to deliver water through the same, the arm $a'$ being for the inlet, and the said joint is provided with a valve seat 2 practically at the base of arm $a'$ and on the inside thereof. The valve $v$ is adapted to occupy the said seat and has vanes or wings 3 at its front slidable in the wall of the arm $a$ and serving, with the stem 4 on the back of the valve, to center the valve on its seat.

The said stem is slidably mounted in a follower plug 6 which is screwed into the opposite arm $a'$ and adjustable back and forth therein to permit the valve to operate, as in Fig. 1, or to effectually close the valve and hold it shut, as in Fig. 2. A spiral spring 5 is wound on the valve stem between the valve and the said follower plug and serves to press the valve normally to its seat but is of such resiliency as to permit the valve to yield under the superior pressure of the water when the tap or faucet, not shown, is opened.

A coupling nut $n$ is engaged over or upon the arm $a'$ and has a cup-shaped cavity adapted to provide a space for the necessary stuffing or packing 8 about the stem 9 thereon to prevent leakage. The said stem is suitably shaped at its end to be engaged by a key 10 to rotate the plug into either closing or opening relation to or with the valve. When the key 10 is removed the cap 12 is screwed into the neck of the nut about the end of said stem 9, and this is the normal or using relation of the parts, Fig. 1.

Suitable disks $d$ and $d$ are slipped over the stem 9 in advance of the packing 8 between the end of the arm $a$ and an annular shoulder therein respectively, to confine the packing regardless of the position of the plug 6 in said arm.

The operation of the device will be clearly understood from the foregoing description, the idea being to utilize the valve $v$ both as a check valve and as a shut-off for the water, and the device may be located at any convenient place in the system. When pressure by the plug 6 is withdrawn from the valve the spring 5 becomes effective and exerts a constant closing action, but the water pressure is supposed to be always in excess of the pressure of said spring and such as to open the valve when the cock or faucet or other controlling medium farther up in the system has been opened. But said spring reasserts itself when the pressure on both sides of the valve becomes normal and keeps the valve closed as well as preventing back-flow of water otherwise trapped in the joint. Practically, therefore, the valve $v$ is adapted to reciprocate within suitable working limits, but its opening action is always against spring 5.

What I claim is:

A device as described comprising a pipe joint, a check valve seated therein having a stem on its rear, a plug adjustable in said joint having a central bore in which said stem is slidably mounted and a spring interposed between said plug and valve, the said plug having a key stem and a nut about the same, packing confined within said nut about said stem spaced apart from the body of said plug, a disk sleeved over said stem and engaged by said nut on the neck of said joint and adapted to confine the packing regardless of the position of the plug, and a cap over the extremity of said key stem.

Signed at Cleveland in the county of Cuyahoga, and State of Ohio, this 10th day of February, 1917.

ARTHUR I. FISCHER.